(12) United States Patent
Guilhamat et al.

(10) Patent No.: US 8,800,883 B2
(45) Date of Patent: Aug. 12, 2014

(54) ACTUATOR DEVICE INCLUDING AN EXPANDABLE MATERIAL

(75) Inventors: Bernard Guilhamat, Saint Michel de Saint Geoirs (FR); Sebastien Dauve, Biviers (FR); Jonathan Fernandez, Saint-Martin-d'Heres (FR); Florent Marquet, Saint Jean de Vault (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 525 days.

(21) Appl. No.: 13/203,157

(22) PCT Filed: Feb. 24, 2010

(86) PCT No.: PCT/FR2010/050320
§ 371 (c)(1),
(2), (4) Date: Dec. 7, 2011

(87) PCT Pub. No.: WO2010/097549
PCT Pub. Date: Sep. 2, 2010

(65) Prior Publication Data
US 2012/0091212 A1    Apr. 19, 2012

(30) Foreign Application Priority Data

Feb. 25, 2009 (FR) ..................................... 09 51182

(51) Int. Cl.
*G05D 23/02* (2006.01)

(52) U.S. Cl.
USPC ......... 236/34.5; 236/93 A; 236/99 J; 236/100

(58) Field of Classification Search
CPC ... G05D 23/015; G05D 23/02; G05D 23/021; G05D 23/022; G05D 23/20; G05D 23/2019; G05D 23/2401; G05D 23/275; G05D 23/30; G05D 23/303; G05D 23/32
USPC .. 236/34.5, 93 R, 93 A, 95, 99 R, 99 A, 99 J, 236/99 K, 100; 60/527, 530
See application file for complete search history.

(56) References Cited

U.S. PATENT DOCUMENTS

| 4,114,681 A * | 9/1978 | Denny .......................... 165/265 |
| 5,263,324 A | 11/1993 | Herndon |
| 7,237,380 B1 | 7/2007 | Safran et al. |
| 2008/0216776 A1* | 9/2008 | Lemberger et al. ........ 123/41.08 |

FOREIGN PATENT DOCUMENTS

| DE | 101 04 690 C2 | 8/2002 |
| GB | 2 374 143 | 10/2002 |

OTHER PUBLICATIONS

International Search Report as issued for PCT/FR2010/050320, Jul. 15, 2010.

* cited by examiner

*Primary Examiner* — Marc Norman
(74) *Attorney, Agent, or Firm* — Pillsbury Winthrop Shaw Pittman LLP

(57) ABSTRACT

An actuator device including: a case housing an expandable material, a moving part that can move in translation as a result of the expansion and/or contraction of the expandable material, and a heater to heat the expandable material. The device also includes: a position sensor which measures the current position of the aforementioned moving part; and a positioner to position the moving part, including a controller acting on the above-mentioned heater according to the current measured position.

15 Claims, 5 Drawing Sheets

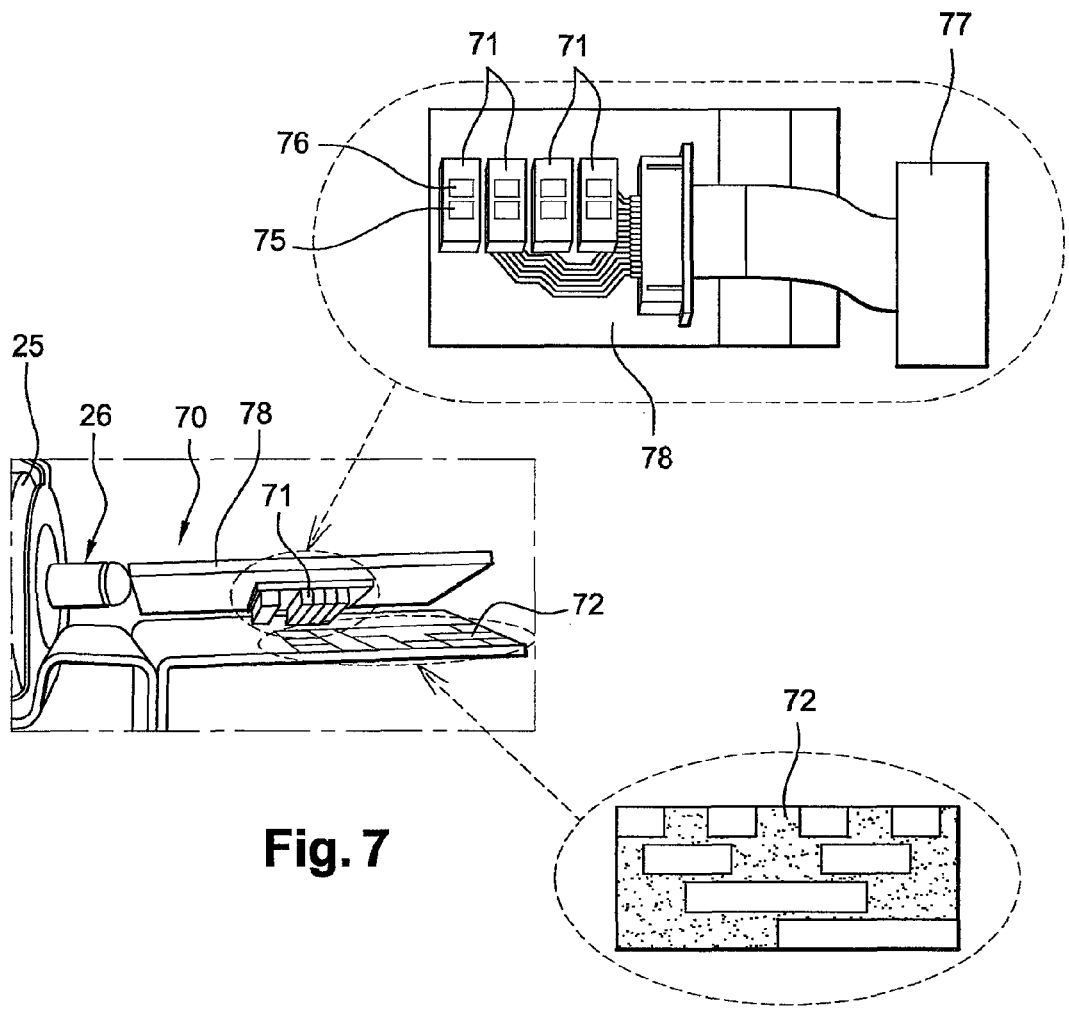
Fig. 7
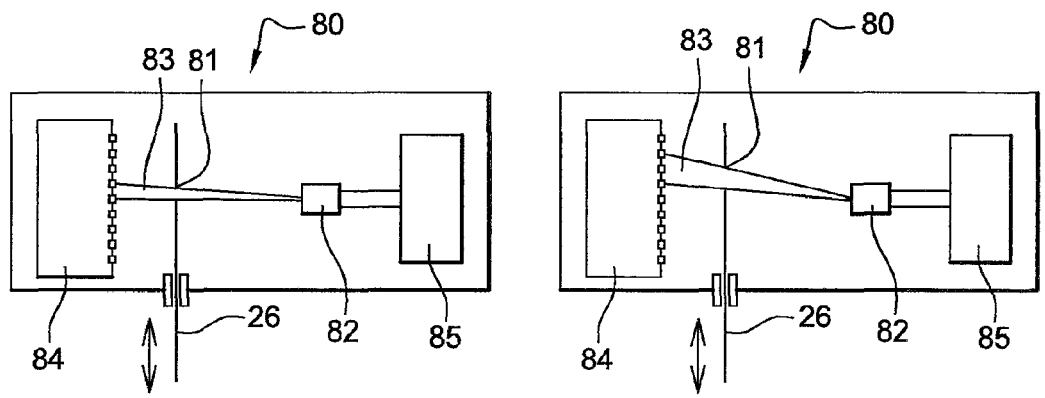
Fig. 8A  Fig. 8B

ACTUATOR DEVICE INCLUDING AN EXPANDABLE MATERIAL

CROSS REFERENCE TO RELATED APPLICATIONS

This application is the U.S. National Stage of PCT/FR2010/050320, filed Feb. 24, 2010, which in turn claims priority to French Patent Application No. 0951182, filed Feb. 25, 2009, the entire contents of all applications are incorporated herein by reference in their entireties.

The present invention concerns an actuator device comprising a thermostatic element including expandable wax, permitting in particular the selective distribution and/or the regulation of a flow of a heat transfer fluid.

The invention has a particularly interesting application in the automobile field, in particular in a cooling circuit of a heat engine, electric engine or hybrid engine, of a motor vehicle. Another field of application of the invention is that of domotics with the regulation of the fluids circulating for example in domestic heating systems. Such a circuit is travelled through by a heat transfer fluid circulating in a closed circuit under the action of a pump so as to thermally regulate and to optimize the functioning of the motor.

To permit this thermal regulation of the engine, the heat transfer fluid passes through the cooling circuit which includes several branches:
- a first branch comprising a heat exchanger at the front of the vehicle, currently designated the radiator;
- a second branch comprising a second heat exchanger at the level of the passenger compartment, currently designated the air heater, and
- a third diversion branch which constitutes a diversion from the cooling radiator, currently designated the "by-pass".

Such a cooling circuit can also comprise other branches comprising for example a deaeration reservoir or other heat exchangers such as water/oil exchangers or water/air exchangers, currently designated supercharging exchangers.

The cooling of the structure of an internal combustion engine is an essential function for protecting the engine from any damage of thermal origin.

The known cooling circuits generally regulate the temperature of the structure of the engine by means of a thermostatic element, also designated a thermostat, having two positions: open or closed. Its change of state depends on the temperature of the heat transfer fluid in which it is bathed with respect to a threshold temperature which is preset in the factory and is fixed for the service life of the engine.

FIG. 1 illustrates an example of a known wax expansion thermostat 10 formed by a brass cartridge 11 filled with an expandable wax 12, typically a mixture of petroleum wax and copper powder, expanding when the temperature increases, a sealing means 13 (typically a joint), a piston 14, a main valve 18 and a "by-pass" valve 15 integral with an actuator 16, the valves 18 and 15 being able to be reset to the initial position by means of springs 17.

The operating principle is as follows: when the temperature of the wax 12 reaches a threshold value, the wax liquefies, expands and comes to exert a thrust force on the piston 14. The piston 14 being held fixed in the thermostat 10, the brass cartridge 11 moves by reaction, displacing the actuator 16 which is integral with the "by-pass" valve 15, so that the "by-pass" branch is shut off by the displacement of the valve 15. Simultaneously with the shutting off of the "by-pass" branch, the main valve 18 moves so as to free the radiator branch and to permit the circulation of the heat transfer fluid towards the radiator.

To this end, FIG. 1 illustrates the flow of the heat transfer fluid circulating through the thermostat 10 according to the positions of the valves 15, 18. Thus, when the thermostat 10 is in its initial position, the main valve 18 shuts off the branch of the radiator and the flow of heat transfer fluid corresponds to the "cold engine" flow. On the other hand, when the temperature of the heat transfer fluid has reached the threshold value, the thermostat 10 changes state: the "by-pass" valve shuts off the "by-pass" branch and the radiator branch is freed; the flow of heat transfer fluid corresponding in this case to the "hot engine" flow illustrated in FIG. 1.

This simple and robust principle permits the use of this type of thermostat 10 in any type of heat transfer circuit requiring regulation. The major disadvantage of the thermostats described above lies in the fact that these devices have their open state fixed to a single temperature threshold by the mixture of the expandable wax 12 which they comprise, this being for the entire service life of the engine.

Now, with the evolution of the anti-pollution standards and the needs to reduce fuel consumption, the engine control strategy is increasingly directed towards a continuous regulation of the operating parameters of the engine, in particular its temperature.

To overcome this disadvantage and to better meet the anti-pollution standards, thermostats have been developed comprising a resistance integrated in the piston inside the brass cartridge. The addition of such a resistance allows the wax to be expanded and the change of state of the thermostat to be brought about before the heat transfer fluid leaving the cylinder head has reached the threshold temperature.

The premature opening of the thermostat permits in particular a reduction of the fuel consumption of the vehicle and also an anticipation of the cooling of the engine when a computer detects an increase in load of the engine, with the risk of causing an overheating thereof.

However, the known actuator devices nevertheless do not allow a precise control of the opening of the valve and a dosing of the quantity of heat transfer fluid passing through this opening.

With this type of device, with or without resistance, the piston moves completely so as to displace the valve and to clear the inlet which it shuts off in the closed position when the threshold temperature is reached.

To control more precisely the opening of the valve, valves have been developed which are entirely controlled electrically, not comprising expandable wax. However, this type of electrically controlled valve does not permit an opening of the valve to be reliably ensured, the electric opening device being able to break down. The breakdown of such a valve can, for example, cause an excessive overheating of an internal combustion engine leading to motor damage being able to extend up to the breaking of the engine.

In this context, the present invention has the aim of providing an actuator device of simple design, reliable and permitting the opening of a valve to be controlled with precision and permitting the quantity of heat transfer fluid which is to be cooled in a cooling circuit to be controlled with precision.

To this end, the invention proposes an actuator device comprising:
- a case housing an expandable material;
- a moving part that can move in translation as a result of the expansion and/or contraction of the expandable material;
- means for heating the said expandable material;
the said device being characterized in that it comprises:
- a position sensor which measures a current position of the said moving part;

means for positioning the said moving part, including control means acting on the said means for heating the said expandable material as a function of the said measured current position.

Owing to the invention, it is possible to control in a precise manner the position of the moving element of the actuating device by controlling the means for heating the expandable material.

The current position of the moving part of the device is measured by the position sensor, then compared with a reference position (given by a computer) via the positioning means. The positioning means then guide the heating means of the expandable material, the expansion of the expandable material influencing the position of the moving part if the current position of the moving part is different from the reference position.

Thus, according to the invention, it is possible to better control the cooling of a heat engine for example by the precise control of the opening and/or of the closure of the valves shutting off the circulation inlets of a heat transfer fluid. The engine control is thus mastered better, permitting for example a cooling of the engine in an optimum manner and a reduction in the consumption of the vehicle.

The device according to the invention can also present one or several of the characteristics below, considered individually or according to all the technically possible combinations:
- the said positioning means comprise an inlet suited to receive a representative signal of a reference position of the said moving part, the said control means acting on the said means for heating the said expandable material such that the variation in temperature of the expandable material brings about the passage of the said moving part from its current position to the said reference position;
- the said position sensor is an inductive sensor formed by a primary excitation coil, two secondary detection coils and by a ferromagnetic core integral with the said moving part;
- the said positioning means comprise:
  - means for generating an excitation signal injected to the terminals of the said primary excitation coil;
  - synchronous detection means to determine the amplitude of the output signal to the terminals of the said secondary detection coils;
  - means for comparison of the amplitude of the said output signal compared to a set value corresponding to the said reference position;
  - the said control means acting on the said means for heating until the said amplitude of the said output signal is equal to the said set value;
  - the position of the said ferromagnetic core varies linearly with the said output signal to the terminals of the said secondary detection coils;
- the said device comprises a crosspiece made from a non-magnetic material, the said crosspiece ensuring the connection between the said moving part and the said ferromagnetic core;
- the said position sensor is an inductive sensor of the DVRT type;
- the said position sensor is a capacitive sensor formed by cylindrical capacitors or flat capacitors;
- the said position sensor is formed by a plurality of optical sensors measuring the said current position of the said moving part by means of an optical ruler;
- the said position sensor is a pressure sensor;
- the said position sensor is a deformation gauge;
- the said expandable material is a mixture of wax or a mixture of alcohol;
- the said device comprises cooling means of the said expandable material such as a Peltier effect device.

The invention also has as an object a thermostatic valve comprising an actuator device according to the invention and at least two entries, of which at least one entry is able to be shut off by the said moving part by translation of the said moving part.

Other characteristics and advantages of the invention will emerge clearly from the description which is given below, by way of indication and in no way in a restrictive manner, with reference to the attached figures, in which:

FIG. 1 is a diagrammatic representation of a thermostatic device of the wax expansion valve type according to the prior art;

FIGS. 2-A and 2-B represent an overall view of a first embodiment of a thermostatic actuator device according to the invention;

FIGS. 3-A and 3-B illustrate the operating principle of a LVDT sensor of a thermostatic actuator device according to the invention as represented in FIGS. 2-A and 2-B;

FIG. 7 illustrates a third embodiment of a thermostatic actuator device according to the invention;

FIGS. 8-A and 8-B illustrate a fourth embodiment of a thermostatic actuator device according to the invention.

In all the figures, the common elements have the same reference numbers.

Figure 1:
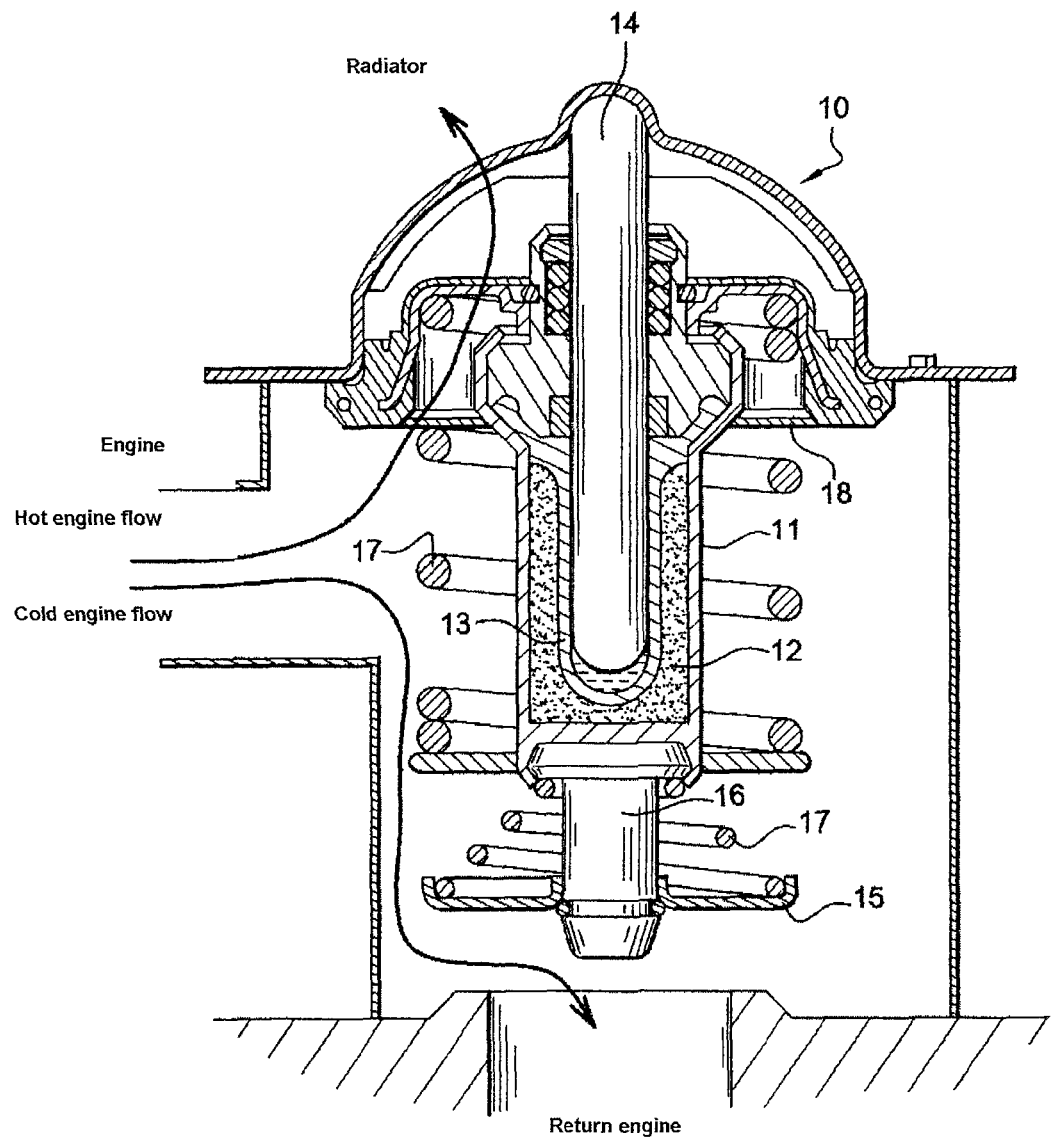

FIG. 1 has already been previously described with reference to the presentation of the prior art.

Figure 2A:
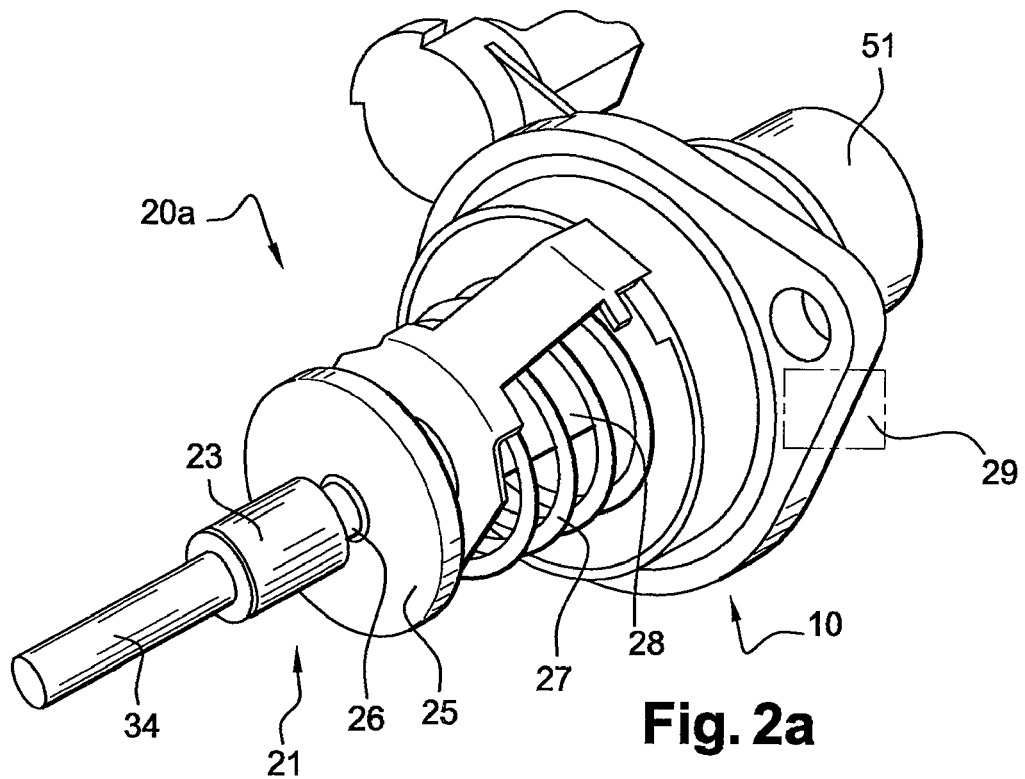
Figure 2B:
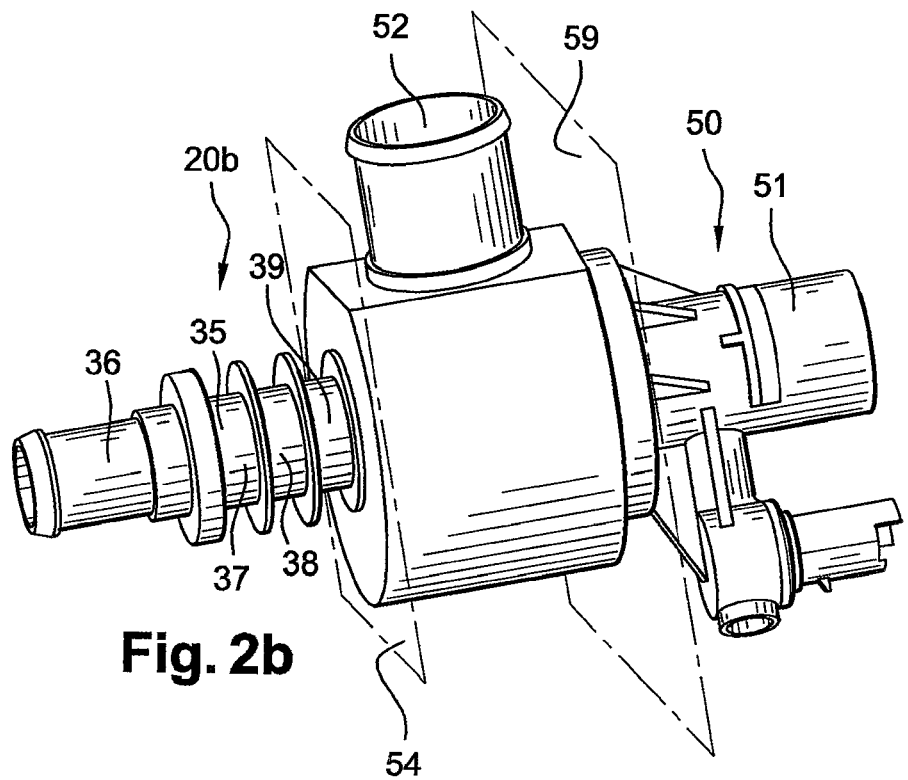

FIGS. 2-A and 2-B illustrate respectively the internal part 20a and the external part 20b of a thermostatic actuator device according to a first embodiment of the invention.

The internal part 20a of the actuator device comprises:
- a cartridge 28, typically of brass, filled with an expandable material, typically a mixture of petroleum wax and copper powder, expanding when the temperature increases and exerting a thrust force on an internal piston which, by reaction, transversely displaces the cartridge 28; the expandable wax being separated from the internal piston by means of a sealing means of the joint type, which is not shown;
- heating means, not shown, of the expandable wax, integrated in the internal piston, typically a heating resistance;
- an actuator 26 integral with the cartridge 28, moving in translation when the wax expands;
- a diversion valve 25, designated a "by-pass" valve, integral with the actuator 26;
- a return spring 27 permitting the cartridge 28 to be returned into initial position and also the actuator 26 when the expandable wax contracts;
- a ferromagnetic core 34 integral with the actuator 26 and with the valve 25;
- a non-magnetic crosspiece 23 integrating the ferromagnetic core 34 to the actuator 26 and to the by-pass valve 25.

FIG. 2-B illustrates the external part 20b of the device according to the invention integrated in a device 50 for regulation of the circulation of heat transfer fluid in the different branches constituting the cooling circuit. To this end, the device 50 also comprises:
- a first pipe 51 suited to be connected to a branch of the cooling circuit comprising a heat exchanger of the radiator type;
- a second pipe 52 suited to be connected to the engine receiving the hot heat transfer fluid leaving the engine;
- a third diversion pipe, designated by-pass pipeline 36, suited to be connected to a by-pass diversion branch of the cooling radiator.

The external part 20b of the device, according to the invention, is formed by:
- a fixed external support 35, of substantially cylindrical shape, comprising three sites 37, 38, 39 on which induction coils (not shown) are wound.

The internal part 20a and the external part 20b of the device are arranged such that the jointing planes 29 and 59 are aligned and such that the ferromagnetic core 34 moves principally inside the external support 35 comprising the induction coils. The operating principle of the actuating device is as follows: when the temperature of the expandable wax reaches a threshold value, the wax liquefies, expands and comes to exert a thrust force on the internal piston. With the internal piston being held fixed in the actuator device, the brass cartridge 28 moves by reaction, moving the actuator 26 which is integral with the "by-pass" valve 25 and the ferromagnetic core 34, such that the by-pass pipe 36 is shut off by the displacement of the valve 25 inside the device 50.

The ferromagnetic core 34 moves transversely inside the external part 20b formed by the external support 35 of cylindrical shape.

The displacement of the actuator 26 and of the by-pass valve 25 by the increase of the temperature of the expandable wax causes the actuator device to pass from an initial position to a final position, in which the by-pass valve 25 comes to shut off the passage towards the by-pass pipe 36, moving substantially at the level of the jointing plane 54 illustrated in FIG. 2-B.

The ferromagnetic core 34 which is movable inside the external part 20b and the fixed induction coils (not shown) thus form an inductive position sensor of the linear variable differential transformer type or LVDT (Linear Variable Differential Transformer). Generally, a LVDT sensor is passive electric sensor of linear displacements formed by a transformer and a core; its response being proportional to the displacement of the core in the cylinder formed by the transformer.

The operating principle of a LVDT sensor 21 is illustrated with reference to FIGS. 3-A and 3-B. The transformer of the LVDT sensor 21 is formed by three fixed coaxial cylindrical coils: a primary excitation coil 31 and two secondary coils 32 and 33; the core being formed by the ferromagnetic core 34, also designated the armature, sliding inside the cylinder formed by the coils 31, 32, 33.

A periodic input voltage $V_{in}$ generally sinusoidal, is applied on the primary coil 31 and the output voltage $V_{out}$ is measured of the secondary coils 32 and 33; the two secondary coils being connected in opposition. In the central position of the core 34, as represented in FIG. 3-A, the voltage at the terminals of each secondary coil 32, 33 is identical, however the coils being connected in opposition, the output voltage $V_{out}$ is equal to zero.

Figure 3A:
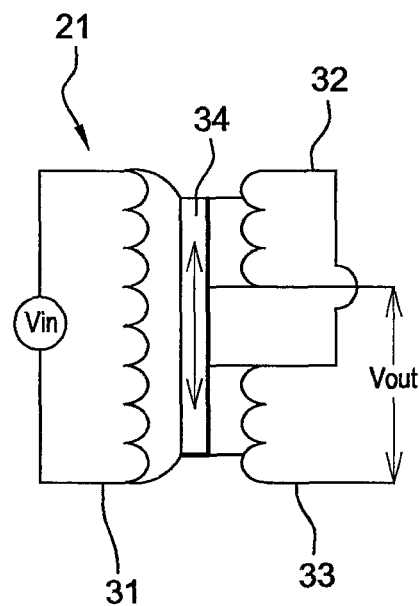
Figure 3B:
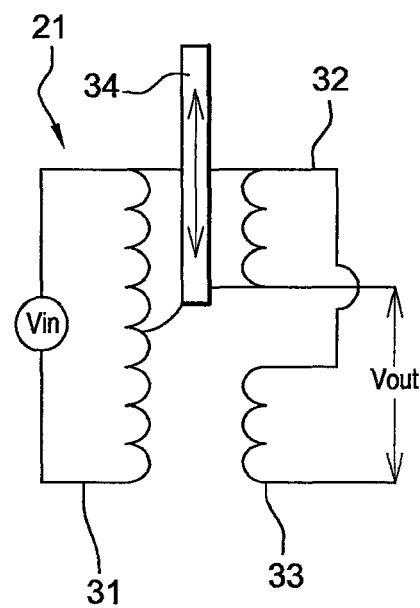

FIG. 3-B illustrates the ferromagnetic core 34 moving from the central position towards a first extreme position corresponding either to the complete opening of the by-pass valve 25 or to the complete closure of the said by-pass valve 25. The ferromagnetic core 34 can also move towards a second extreme position (not shown), opposed transversely to the first extreme position, and corresponding to the complete closure of the by-pass valve 25 if the first extreme position corresponds to the complete opening of the by-pass valve 25 and vice versa.

In this new position, illustrated in FIG. 3-B, the core 34 modifies the distribution of the magnetic field of the two secondary coils and consequently the output signal $V_{out}$. Thus, the output voltage $V_{out}$ varies in a continuous manner with the displacement of the ferromagnetic core 34 between the first extreme position and the second extreme position.

The LVDT position sensor 21 thus presents a particularly interesting linearity, permitting a correlation of a displacement of the core 34 with a generated output voltage $V_{out}$, which permits using this detection principle in the thermostatic device according to the invention. In fact, the linearity of the position sensor 21 permits controlling in a precise manner the opening and/or the closure of the valve 25, but also the position of the actuator 26 over its entire range of use.

In application of the above to the device according to the invention, the coils 31, 32, 33 are fitted concentrically on the external cylindrical support 35 and more precisely respectively at the level of the sites 37, 38, 39; the primary excitation coil 31 comprises a number n1 of turns and is wound at the level of the site 38 between the two secondary coils 32 and 33 each comprising a number n2 of turns. The ferromagnetic core 34 integral with the actuator 26 and with the by-pass valve 25 is movable inside the external support 35 on which the coils 31, 32, 33 are wound.

The ferromagnetic core 34 integral with the actuator 26 is dipped in the flow of the heat transfer fluid of the by-pass branch. Advantageously, the ferromagnetic core 34 is made of a material permitting resistance to the heat transfer fluid, composed typically of a mixture of water and of ethylene glycol and of a corrosion inhibitor, in the case of the use of the actuator device in the management of the cooling of an engine of a motor vehicle.

The non-magnetic crosspiece 23 has a variable length, permitting adjustment of the initial position of the ferromagnetic core 34 with respect to the coils 31, 32, 33 and permitting a guarantee for the extreme positions, of the actuator 26 and of the valves 25, of the use of the range of linearity of the LVDT sensor.

The non-magnetic crosspiece 23 also permits the isolating and distancing of the metallic environment situated close to the ferromagnetic core.

Figure 4:
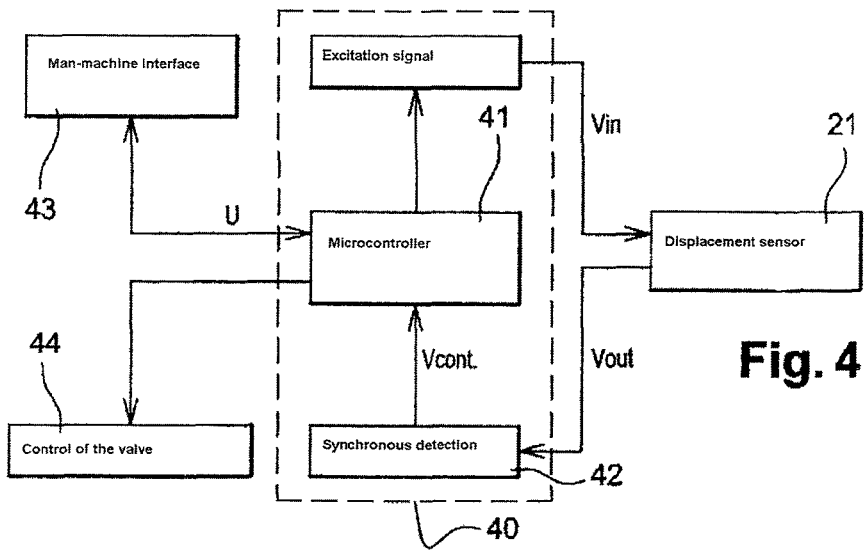
FIG. 4 illustrates a synoptic control diagram of a thermostatic actuator device as represented in FIGS. 2-A and 2-B.

FIG. 4 illustrates a synoptic diagram of the control means of a thermostatic actuator device as represented in FIGS. 2-A and 2-B.

The control means 40 are formed by a microcontroller 41, or any other control electronics such as, for example, an on-board computer, comprising an input suited to receive a signal originating from a human-computer interaction (HCI) 43 or an on-board computer. The microcontroller 41 generates an excitation signal, advantageously of triangular type which corresponds to the input excitation voltage $V_{in}$ of the primary coil 31 of the LVDT sensor. The excitation signal can be indiscriminately a signal of sinusoidal, triangular or else rectangular type.

The signal leaving the LVDT sensor 21 is a signal of periodic sinusoidal type and corresponds to the output voltage $V_{out}$ at the terminals of the secondary coils 32, 33. This output signal is then processed via means 42 by synchronous detection at the same frequency as the excitation signal, which allows a continuous voltage $V_{cont}$ to be obtained, proportional to the amplitude of the output signal $V_{out}$.

The continuous voltage $V_{cont}$ is then digitized then reinjected in the microcontroller 41 so as to be compared with a reference voltage U originating from the said man-machine interface 43, the said reference voltage U being representative of a set or reference position of the ferromagnetic core 34, and consequently of a particular opening position of the by-pass valve 25.

If the continuous voltage $V_{cont}$ corresponds to the reference voltage U, then the control means 40 via the microcontroller 41 control the stoppage of the supply of the heating means 44 of the expandable wax.

Vice versa, if the continuous voltage $V_{cont}$ does not correspond to the reference voltage U, i.e. if the position of the by-pass valve 25 does not correspond to the reference position, then the control means 40 continue to supply the heating means 44 in order to increase the expansion of the wax, so as to bring about a supplementary translation of the actuator 26 and of the by-pass valve 25, or continues not to supply the heating means 44; the choice of heating or of not heating the expandable wax depending on the relative position of the actuator 26 and of the by-pass valve 25 with respect to the reference position fixed via the human-computer interaction 43.

Figure 5:
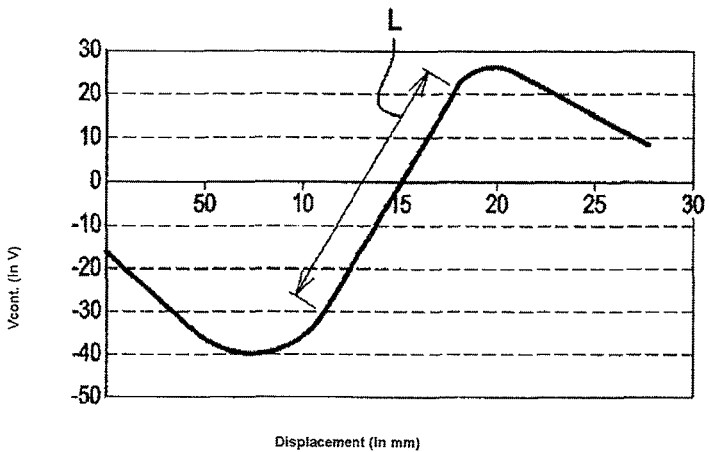
FIG. 5 illustrates an example of variation of the amplitude of the output voltage of the LVDT sensor as represented in FIGS. 3-A and 3-B as a function of the displacement of the magnetic core of the thermostatic actuator device represented in FIGS. 2-A and 2-B.

An example of variation in the amplitude of the output voltage of the LVDT sensor as represented in FIGS. 3-A and 3-B as a function of the displacement of the magnetic core of the thermostatic actuator device represented in FIGS. 2-A and 2-B is illustrated in FIG. 5.

The illustrated variant in FIG. 5 comprises a linear part L on which the device according to the invention will preferably be operated, in particular by the control means 40.

In this linear part L, at each amplitude value $V_{cont}$ there corresponds a relative position of the ferromagnetic core 34. The linear variation for a LVDT sensor comprising a homogeneous coiling is in the order of ±1% for a displacement of the ferromagnetic core 34 in the order of 15 mm. This linear variation will be able to be increased, however, by optimizing the distribution of the turns on the surface of the coils.

Thus, the device according to the invention allows control in a precise manner of the relative position of the actuator 26 and also the opening and/or closure of the valve 25 of the device as a function of different situations.

In a motor vehicle application, the device according to the invention allows a more efficient motor control to be obtained, in particular by the precise and known control of the flows of heat transfer fluid which are to be cooled.

According to a variant of this first example embodiment, described advantageously with an inductive position sensor of the LVDT type, the ferromagnetic core 34 which is movable inside the external part 20*b* can be replaced by a bar of non-magnetic conductive material, such as for example copper, brass, or else aluminium. Preferably a material will be chosen having a low resistivity, so as to obtain a good connection. Advantageously, copper or else brass will be preferred materials compared with more costly non-magnetic conductive materials.

In this case, the induction coils creating a magnetic field induce a connection by Eddy current passing through the non-magnetic conductive material. By preserving the structure of the LVDT sensor, as previously described, with induction coils, and by adding a brass bar as a replacement of the ferromagnetic core 34, a sensor is then obtained with a loss of sensitivity in the order of 50% compared to the LVDT sensor, which remains satisfactory for an application in a thermostatic actuator device of a motor vehicle.

In this variant, the described structure of the LVDT sensor remains identical, except for a few modifications of the microcontroller which are necessary to modify the adjustments of gains and of the detection phase (shifting of the phase of 90°), the frequencies and the excitation currents remaining identical.

The first example embodiment of the invention was described advantageously with an inductive position sensor of the LVDT type; however, the actuator device according to the invention can comprise other types of inductive sensor formed, for example, by a tuned circuit of the RLC type or else by a DVRT (Differential Variable Reluctance Transducer) comprising a single coil realizing both the excitation and the detection.

Figure 6:
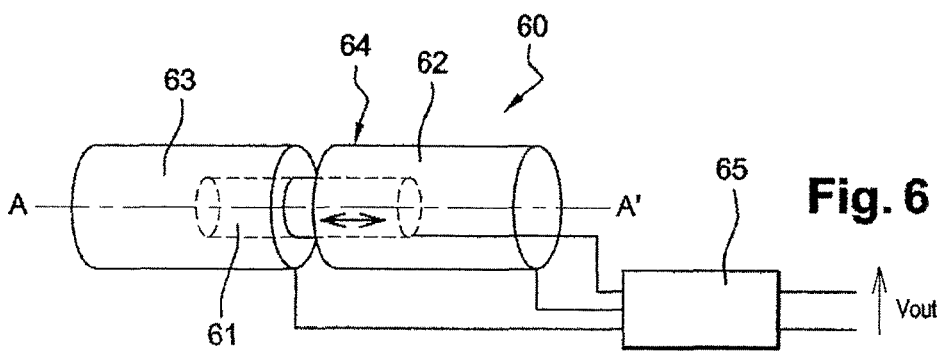
FIG. 6 illustrates a second embodiment of a thermostatic actuator device according to the invention.

FIG. 6 illustrates a second embodiment of a thermostatic actuator device according to the invention.

In this second embodiment, the device according to the invention takes up again the principal characteristics of the actuator device which was previously described.

According to this second embodiment, the actuator device comprises:

- a cartridge (not shown), typically of brass, filled with an expandable material, typically a mixture of petroleum wax and of copper powder, expanding when the temperature increases and exerting a thrust force on an internal piston which, by reaction, displaces the cartridge transversely; the expandable wax being separated from the internal piston by means of a sealing means of the joint type, which is not shown;
- heating means, not shown, of the expandable wax integrated in the internal piston, typically a heating resistance;
- an actuator integral with the cartridge, moving in translation when the wax expands;
- a by-pass valve integral with the actuator;
- a return spring permitting the returning into initial position of the cartridge and the actuator when the expandable wax contracts;
- a cylindrical capacitor 64 comprising two fixed armatures 62, 63 and one movable armature 61, integral with the actuator and with the by-pass valve; the fixed armatures 62, 63 forming a cylinder in which the movable armature 61 is translated as a function of the movements of the actuator.

The cylindrical capacitor 64 forms a position sensor 60 of capacitive type with variable surfaces, the armature 61 of which is movable along the axis of the cylinders of the armatures 62, 63.

The capacities formed between these armatures vary in an opposed manner to the displacement of the movable armature 61 in the interior of the cylinder 64, i.e. in an opposed manner to the displacement of the actuator or of the by-pass valve of the actuator device according to the invention; the actuator moving along the axis AA' which is shown.

The measurement of the capacities between the armatures is realized by a specific integrated circuit 65 ASIC (for Application Specific Integrated Circuit), the integrated circuit 65 providing an output voltage $V_{out}$ as a function of the position of the armature 61, the armature 61 being integral with the actuator of the actuator device. Thus, a capacitive sensor 60, as described, can be integrated in the synoptic principle previously described with reference to FIG. 4, so as to control the opening/closure of the valves of the device according to the invention. It will be noted, however, that in this second embodiment, the synchronous detection means 42, of the synoptic diagram illustrated in FIG. 4, are replaced by a device currently used in accelerometer reading in the form of a specific integrated circuit or ASIC.

In this second embodiment, the capacitive position sensor 60 is principally formed by cylindrical capacitors; however, the capacitive position sensor can be formed indiscriminately by flat or cylindrical capacitors functioning indiscriminately on the principle of variable surfaces or variable spacing.

FIG. 7 illustrates a third embodiment of a thermostatic actuator device according to the invention.

In this third embodiment, the device according to the invention takes up again the principal characteristics of the actuator device previously described in FIGS. 2-A and 2-B.

According to this third embodiment, the actuator device comprises:
- a cartridge (not shown), typically of brass, filled with an expandable material, typically a mixture of petroleum wax and of copper powder, expanding when the temperature increases and exerting a thrust force on an internal piston which, by reaction, displaces the cartridge transversely; the expandable wax being separated from the internal piston by means of a sealing means of the joint type, which is not shown;
- heating means, not shown, of the expandable wax integrated in the internal piston, typically a heating resistance;
- an actuator 26 integral with the cartridge, moving in translation when the wax expands;
- a by-pass valve 25 integral with the actuator;
- a return spring permitting the returning to the initial position of the cartridge and also the actuator when the expandable wax contracts;
- a plurality of optical digital sensors 71, assembled on a printed circuit 78, the said printed circuit 78 being integral with the actuator 26 which is movable in translation;
- a fixed optical ruler 72.

In this third embodiment of the device according to the invention, the plurality of optical digital sensors 71 and the optical ruler 72 form a position sensor 70 of the optical sensor type.

The plurality of optical digital sensors 71 measures the relative displacement of the actuator 26 by means of the optical ruler 72 via an absolute coding. The optical ruler 72 is coded on 4 bits and comprises sixteen different positions read by the optical digital sensors 71.

The coding of the ruler 72 is realized by means of a binary code of the Gray code type, or another type of code, the Gray code consisting in coding a plurality of positions by a binary coding such that on a passage from one position to a consecutive position, a single bit is modified.

According to a particular embodiment of the invention, the binary state 0 of the digital ruler is realized by a black coding line and the binary state 1 is realized by a white coding line.

Each optical digital sensor 71 is formed by an emission diode 75 emitting light so as to illuminate the said digital ruler 71, and by a reception diode 76, photosensitive to light, detecting the presence of a black line or of a white line, the white reflecting a large portion of the light emitted by the emission diode, and the black absorbing a large portion of the light emitted by the emission diode 75.

The position sensor 70 also comprises a microcontroller 77, or another calculation system, receiving the binary information provided by the optical sensors 71 indicating the position of the sensors and more generally the position of the valve of the device. According to the position of the valve 25 and of the actuator 26, the microcontroller 77 determines by means of a supply set point the heating or not via the heating resistance present in the interior of the brass cartridge of the device, so as to position the valve according to the reference position set via human-computer interaction.

Thus, the device comprising a position sensor 70 formed by a plurality of optical digital sensors 71 permits the control in a precise manner of the opening and/or of the closure of the actuator 26 and also of the by-pass valve 25 of the device by control of the temperature of the expandable wax via the heating means as a function of different situations of the engine, the position of the actuator and of the valve being determined by optical reading by means of optical sensors and of a digital ruler.

FIG. 7 illustrates in particular a plurality of movable optical digital sensors 71, integral with the actuator 26 of the device according to the invention and a fixed optical ruler 72. However, the operating principle previously described is also applicable for a device comprising a plurality of fixed optical digital sensors 71 and a movable optical ruler 72 integral with the actuator 26 of the actuating device according to the invention, the use of fixed optical digital sensors 71 being particularly advantageous with respect to the use of movable optical digital sensors 71, in particular for the simplification of the wiring of the sensors.

The fourth embodiment illustrated in FIGS. 8-A and 8-B is a variant of the embodiment described with reference to FIG. 7; the device according to the invention taking up again the principal characteristics of the previously described actuator device.

In this fourth embodiment, the optical position sensor 80 is realized by means of a movable slot 81 integral with the actuator 26 and a lighting means formed by an electroluminescent diode 82 producing a beam of light 83 passing through the said movable slot 81 illuminating a bank of photodiodes 84 with a specific beam width. The position of the beam of light 83 on the bank of photodiodes 83 thus permits, via a microcontroller 85, a determining of the absolute position of the movable slot 81 and also the position of the actuator 26 of the device.

According to a fifth embodiment of the invention, the actuator device comprises a position sensor of the pressure sensor type. Advantageously, the pressure sensor is arranged on the thrust axis of the actuator in a cavity comprising an air/oil mixture and the volume of which varies with the movement of the actuator.

According to a sixth embodiment of the invention, the actuator device comprises a position sensor of the strain gauge type. The strain gauge is placed on the structure of the device and measures the deformation thereof as a function of the thrust of the actuator of the device by variation of its resistance. The strain gauge being integrated in a branch of a Wheatstone bridge, the output voltage of the Wheatstone bridge is variable as function of the deformation of the structure and hence of the position of the actuator and also of the opening and/or closure of the by-pass valve.

Thus, the actuator device comprising a position sensor according to the invention permits on the one hand a control in a precise manner of the opening and/or the closure of the actuator and also the valves of the device as a function of different situations of the engine.

The control of the opening/closure of the device permits the adjustments of the engine to be controlled more efficiently, in particular by the control of the flows of heat transfer fluid which is to be cooled.

The control of the actuator of the device permits control with precision of the position of the actuator and thus the opening of the valves over the entire range of opening of the valves, this being before reaching the extreme opening position of the valve. The precision of the opening position is in the order of 1 hundredth of the total range of opening of the valve. The actuator device according to the invention also permits a reliable nominal functioning to be preserved, guaranteeing the opening and/or the closure of the valves when the threshold temperature of the heat transfer fluid is reached, by the use of an expandable material expanding starting from a threshold temperature.

The actuator device as described can be used advantageously in internal combustion engines of motor vehicles, so as to bring about the opening and/or closure of a valve of a circuit for cooling, air, fuel, oil. However, the device according to the invention is also applicable in domotics, for example for the opening of valves, shutters and regulation system of a flow of fluid.

The thermostatic actuator device used in particular in the cooling circuits of internal combustion engines of motor vehicles permits a regulation of the temperature of the heat transfer fluid which is introduced into the engine to optimize its function, acting on the introduction of a flow of fluid, designated "cold", originating from the cooling radiator of the vehicle and/or of the introduction of a flow of liquid designated "hot" originating from the engine, which is mixed to constitute a heat transfer fluid designated "tepid", which is introduced into the engine.

The invention has been principally described with a brass cartridge comprising an expandable material of the wax type; however, the invention is also applicable to a thermostatic actuator device comprising a cartridge containing an expandable material of the alcohol mixture type.

The device according to the invention can comprise means for cooling more efficiently the wax or the expandable material in particular by the addition of means permitting the creation of a displacement of the heat in the presence of an electric current, by the Peltier effect.

The other advantages of the invention are in particular as follows:
  ease of implementation;
  respect for the mechanical constraints of occupied space which are imposed;
  temporal stability of the opening response of the valves ensured by the simplicity of the device.

The invention claimed is:

1. An actuator device comprising:
   a case housing an expandable material;
   a moving part in translation under the action of the expansion and/or contraction of said expandable material;
   a heater configured to heat said expandable material;
   a position sensor configured to measure a current position of said moving part;
   a positioner configured to position said moving part, the positioner including a controller configured to act on said heater to heat said expandable material as a function of said measured current position.

2. The device according to claim 1, wherein said positioner comprises an inlet configured to receive a representative signal of a reference position of said moving part, said controller acting on said heater such that the variation in temperature of the expandable material brings about the passage of said moving part from its current position to said reference position.

3. The device according to claim 1, wherein said position sensor is an inductive sensor formed by a primary excitation coil, two secondary detection coils and by a ferromagnetic core integral with said moving part.

4. The device according to claim 3, wherein said positioner comprises:
   a generator configured to generate an excitation signal injected to the terminals of said primary excitation coil;
   a synchronous detector configured to determine an amplitude of the output signal to the terminals of said secondary detection coils;
   a comparator configured to compare the amplitude of said output signal compared to a set value corresponding to said reference position;
   said controller acting on said heater until said amplitude of said output signal is equal to said set value.

5. The device according to claim 3, wherein the position of said ferromagnetic core varies linearly with said output signal to the terminals of said secondary detection coils.

6. The device according to claim 3, wherein said device comprises a crosspiece made from a non-magnetic material, said crosspiece ensuring a connection between said moving part and said ferromagnetic core.

7. The device according to claim 1, wherein said position sensor is an inductive sensor of the DVRT type.

8. The device according to claim 1, wherein, said position sensor is a capacitive sensor formed by cylindrical capacitors or flat capacitors.

9. The device according to claim 1, wherein, said position sensor is formed by a plurality of optical sensors measuring said current position of said moving part using an optical ruler.

10. The device according to claim 1, wherein, said position sensor is a pressure sensor.

11. The device according to claim 1, wherein, said position sensor is a deformation gauge.

12. The device according to claim 1, wherein said expandable material is a mixture of wax or a mixture of alcohol.

13. The device according to claim 1, comprising a cooler configured to cool, said expandable material.

14. The device according to claim 13, wherein the cooler comprises a Peltier effect device.

15. A thermostatic valve, comprising an actuator device according to claim 1 and at least two entries, of which at least one entry is able to be shut off by said moving part by translation of said moving part.

* * * * *